Sept. 22, 1959  H. A. CASPARI  2,904,977

FRICTION CLUTCH

Filed April 11, 1957

INVENTOR

Hans Albrecht Caspari

By

Patent Agent

United States Patent Office 2,904,977
Patented Sept. 22, 1959

2,904,977

FRICTION CLUTCH

Hans Albrecht Caspari, Bremen-Lesum, Germany, assignor to Spinnbau G.m.b.H., Bremen-Farge, Germany, a firm Application April 11, 1957, Serial No. 652,283

Claims priority, application Germany April 26, 1956

6 Claims. (Cl. 64—30)

The present invention relates to spinning machines, and more particularly to a friction clutch for positively driven parts of such machines such as spinning or twisting spindles, spinning heads and the like.

Most of the heretofore known friction clutches employed for the above mentioned purpose produce the necessary friction by means of springs, and have the disadvantage of being more or less complicated in design. They are, therefore, rather expensive, easily subject to breakdowns, and are uneconomical in practice.

It is the principal object of the present invention to provide a new type of friction clutch which is especially adapted for driving one of the numerous spindles of a spinning or twisting machine and is considerably simpler in construction and operation than heretofore known clutches used for this purpose. It is also an object of the present invention to provide an improved friction clutch which while being highly reliable and safe in operation can be produced and installed at low cost and will be far less subject to breakdowns or other disturbances, and therefore much more economical in every respect than heretofore known clutches of the type involved. It is still another obpect of this invention to provide a friction clutch arrangement of the type set forth in the preceding paragraphs, which will develop relatively little frictional heat and will pass off such heat very quickly.

The present invention consisits primarily in utilizing either the main drive shaft or the respective driven shaft itself as one of the clutch members, and without any alteration of such shaft, while the other clutch member consists of at least one element which at least partly embraces the shaft and produces the required frictional engagement therewith either by its own inherent tension or by means of additional resilient members.

A very valuable advantage of the new clutch consists in that, due to the simplicity of its design and the fact that the respective drive shaft or driven shaft itself serves as one of the clutch members, it can be very easily installed on an existing machine.

Furthermore, despite the simplicity of the new clutch, the degree of friction produced thereby is very easily adjustable.

The new clutch may be applied either to the main drive shaft or to the individual spindle shafts. In the first instance, the clutch is rigidly secured to the worm wheel or similar driving gear which is rotatably mounted on the drive shaft, and frictionally engages the drive shaft itself, while in the second instance it is rigidly secured to the worm or similar driven gear on the spindle shaft and frictionally engages the spindle shaft itself.

It is another object of the present invention to provide a clutch of the type described, which directly transmits the rotary driving force as long as the resistance to the rotation of the driven shaft produced by the normal operation thererof remains within predetermined limits, but which slips relatively easy, at relatively low friction, and without developing any considerable frictional heat as soon as such prescribed limit is being exceeded, for example if the spinning spindle is being stopped by hand.

This object of the invention has been materialized by making one clutch member, namely, the one which at least partly encompasses the shaft serving as the other clutch member of a suitable material which, on the one hand, exerts a relatively high contact pressure upon such shaft as long as the clutch is engaged to drive the spindle but, on the other hand, has excellent sliding or bearing qualities as soon as the resistance upon the spindle exceeds that of its normal operation, and the clutch begins to slip.

Such relatively low frictional heat as might be developed when the clutch slips, is easily taken up by the one clutch member itself, namely, the drive shaft, since it is of solid material, while the other clutch member may be made of a suitable shape either to pass off such heat very quickly or to absorb it.

In order to facilitate the installation and removal of the new clutch, its main clutch member is preferably made of two or more clamps, straps, shackles, or the like which encompass the shaft and are connected to each other by bolts or the like so as to press upon the shaft from several directions. The contact pressure of these straps or shackles upon the shaft may be adujsted to any particular value, for example, by means of a tension wrench.

In the event that the traps or shackles are made of a material which expands considerably even when heated by the relatively lower friction of the clutch so that the contact pressure thereof upon the shaft might vary too much, suitable springs may be provided on the clamping bolts to insure that the contact pressure will remain substantially constant under any operating conditions.

Further objects, features, and advantages of the present invention will be apparent from the following detailed description thereof, particularly when read with reference to the accompanying drawings, in which—

Fig. 7 shows a clutch similar to those of Figs. 1 to 4 but provided with cooling ribs; while

Figure 1:
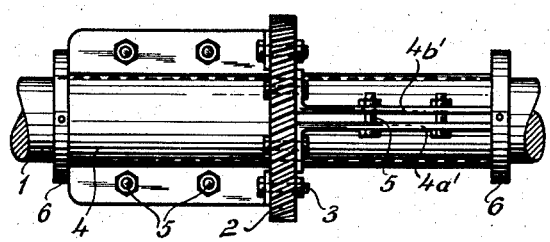
Fig. 1 shows a side view of the new clutch having a clutch member at both sides of the worm wheel and consisting of sheet metal clamps.
Figure 2:
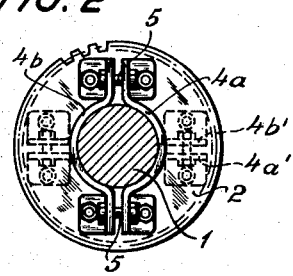
Fig. 2 shows an end view of Fig. 1.

Referring to the drawings, and more specifically to Figs. 1 and 2 thereof, the drive shaft 1 has rotatably mounted thereon a drive gear 2, preferably a worm wheel, which, in turn, has a clutch member 4 secured thereto on both sides thereof by means of bolts 3. Each of the two sides of clutch member 4 consists of two parts 4a, 4b, and 4a', 4b', respectively, forming clamps or shackles made of sheet metal which are secured to each other by means of clamping bolts 5 and are thus pressed against drive shaft 1 so that the proper clutch-engaging pressure will be attained. For this purpose, a tension wrench may be used which permits an adjustment of the shackles to a definite pressure upon shaft 1. Consequently, drive shaft 1 itself forms the other clutch member. A pair of set collars 6 secured to shaft 1 at both ends of the clutch prevents it from shifting in the axial direction.

Figure 3:
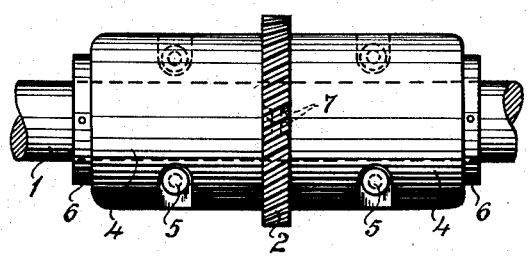
Fig. 3 shows a side view of the clutch which differs from that of Figs. 1 and 2, in that the clutch members around the shaft are of solid material.
Figure 4:
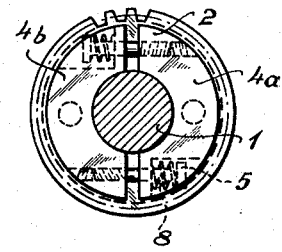
Fig. 4 shows an end view of Fig. 3.

The modification as shown in Figs. 3 and 4 shows the clutch member 4 as being made of solid material preferably consisting of a fine-zinc alloy which, on the one hand, exerts a high driving pressure upon the shaft but, and on the other hand, slides very easily thereon when such pressure has been overcome. The other details of the construction of this clutch as shown in Figs. 3 and 4 are substantially the same as those in Figs. 1 and 2, except for the fact that, according to Figs. 3 and 4, the worm wheel 2 for driving the spindle may also be taken along by clutch member 4, for example, by means of pins 7.

In the event that the frictional heat might affect the dimensions of the clutch members to such an extent that the clutch pressure might change too much, compression springs 8 may be mounted on clamping bolts 5 which will insure a substantially constant clutch pressure.

Figure 5:
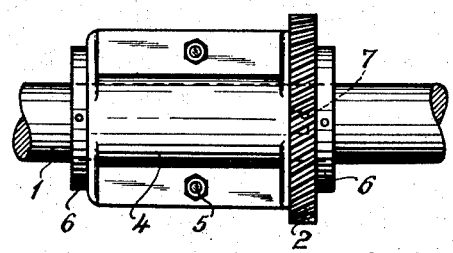
Fig. 5 represents in side view a modified clutch according to the invention in which a clutch member is provided at only one side of the worm wheel.
Figure 6:
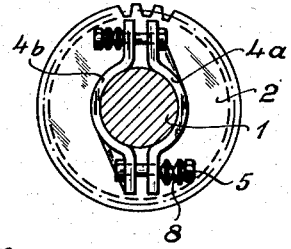
Fig. 6 represents an end view of the clutch arrangement of Fig. 5.

A further modification of the invention is shown in Figs. 5 and 6 which illustrate how the clutch member 4 may be provided on only one side of the worm wheel 2 for driving the spindle if there is a lack of space but sufficient surface area to pass off the frictional heat. The other details of construction of this clutch may be similar to those above described relative to Figs. 1 to 4.

Figure 7:
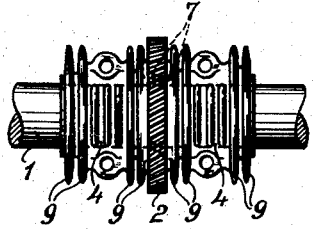

Although extensive tests have shown that generally there is no need for any cooling ribs to pass off the frictional heat, Fig. 7 illustrates how such cooling ribs 9 may be provided on the outer surface of clutch 4.

Figure 8:
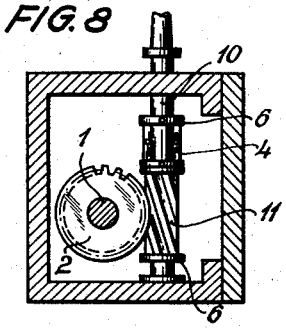
Fig. 8 shows a modification of the invention in which the new clutch is mounted on the spindle shaft.

Fig. 8 shows still another modification of the invention, in which the driven spindle shaft 10 forms one of the clutch members. Worm 11 which is rotatably mounted on shaft 10 is rigidly connected to the other clutch member 4 in a manner similar to that of Fig. 1.

The clutch according to the present invention is of such simple design that its individual parts may also be produced by chill casting without requiring any considerable finishing. The clutch member 4 may also consist of only one shackle or the like which is tightened against the drive shaft from only one side by means of bolts 5. It may also consist of a slotted tube which is slipped upon drive shaft 1 from one end thereof. In such an instance, the inner tension of the tube would produce the required frictional engagement of the clutch with drive shaft 1.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In combination: a rotatable shaft, gear means mounted on and selectively turnable relative to said shaft, two clamping members arranged on opposite sides of said shaft so as to face each other, each of said clamping members having two spaced longitudinal marginal portions interconnected by an arched central portion for frictional engagement with said shaft, first connecting means pulling the respectively oppositely located marginal portions of said clamping members together to frictionally connect said clamping members to said shaft, and second connecting means arranged at that end of said clamping members which is adjacent said gear means and firmly connecting the latter to said clamping members for coupling the latter to said gear means.

2. A friction clutch for spinning machines comprising a spinning spindle or the like, a worm secured to said spindle, a drive shaft, a worm wheel rotatably mounted on said shaft and in mesh with said worm, two clamping members arranged on opposite sides of said spindle so as to face each other, each of said clamping members having two spaced longitudinal marginal portions interconnected by an arched central portion for frictional engagement with said spindle, first connecting means pulling the respectively oppositely located marginal portions of said clamping members together to frictionally connect said clamping members to said spindle, and second connecting means arranged at that end of said clamping members which is adjacent said worm and firmly connecting the latter to said clamping members for coupling the latter to said gear means.

3. A friction clutch for spinning machines comprising a drive shaft, a worm wheel secured to said shaft, a spinning spindle, a worm rotatably mounted on said spindle and in mesh with said worm wheel, two clamping members arranged on opposite sides of said spindle so as to face each other, each of said clamping members having two spaced longitudinal marginal portions interconnected by an arched central portion for frictional engagement with said spindle, first connecting means pulling the respectively oppositely located marginal portions of said clamping members together to frictionally connect said clamping members to said spindle, and second connecting means arranged at that end of said clamping members which is adjacent said worm and firmly connecting the latter to said clamping members for coupling the latter to said worm.

4. A friction clutch as defined in claim 1, further comprising means for adjusting the tension of said clamping members on said shaft.

5. In combination: a rotatable shaft, gear means mounted on and selectively turnable relative to said shaft, two clamping members arranged on opposite sides of said shaft so as to face each other, each of said clamping members having two spaced longitudinal marginal portions interconnected by an arched central portion for frictional engagement with said shaft, connecting bolts extending through said marginal portions and having a threaded section, nut means engaging said threaded section, spring means respectively surrounding said bolts and arranged intermediate said nut means and the respective adjacent marginal portion of said clamping members, and connecting means arranged at that end of said clamping members which is adjacent said gear means and firmly connecting the latter to said clamping members for coupling the latter to said gear means.

6. In combination: a rotatable shaft, gear means mounted on and selectively turnable relative to said shaft, two clamping members arranged on opposite sides of said shaft and on one side of said gear means and on opposite sides of said shaft so as to face each other, each of said clamping members having two spaced longitudinal marginal portions interconnected by an arched central portion for frictional engagement with said shaft, first connecting means pulling the respectively oppositely located marginal portions of said clamping members together to frictionally connect said clamping members to said shaft, and second connecting means arranged at that end of said clamping members which is adjacent said gear means and firmly connecting the latter to said clamping members for coupling the latter to said gear means.

References Cited in the file of this patent

UNITED STATES PATENTS

| | | |
|---|---|---|
| 601,297 | Wildman | Mar. 29, 1898 |
| 793,601 | Moore | June 27, 1905 |
| 1,300,748 | Lombard | Apr. 15, 1919 |
| 1,601,438 | Gustafson | Sept. 28, 1926 |
| 2,760,800 | Wekeman | Aug. 28, 1956 |
| 2,793,515 | Hunstiger et al. | May 28, 1957 |

FOREIGN PATENTS

| | | |
|---|---|---|
| 926,102 | Germany | Apr. 7, 1955 |